(12) United States Patent
Mudu et al.

(10) Patent No.: US 8,581,840 B2
(45) Date of Patent: Nov. 12, 2013

(54) MULTI-TOUCH MEASURE COMPARISON

(75) Inventors: Ernesto Mudu, Paris (FR); Valdrin Koshi, Paris (FR); Ali Meziani, Paris (FR)

(73) Assignee: SAP AG, Walldorf (DE)

( * ) Notice: Subject to any disclaimer, the term of this patent is extended or adjusted under 35 U.S.C. 154(b) by 221 days.

(21) Appl. No.: 13/283,903

(22) Filed: Oct. 28, 2011

(65) Prior Publication Data

US 2013/0106708 A1    May 2, 2013

(51) Int. Cl.
*G06F 3/01*    (2006.01)

(52) U.S. Cl.
USPC ........... 345/156; 345/173; 345/440; 345/441; 715/700

(58) Field of Classification Search
None
See application file for complete search history.

(56) References Cited

U.S. PATENT DOCUMENTS

| | | | |
|---|---|---|---|
| 8,229,794 B2* | 7/2012 | Sundaresan et al. | 705/26.1 |
| 2011/0115814 A1* | 5/2011 | Heimendinger et al. | 345/619 |

* cited by examiner

*Primary Examiner* — Joseph Haley
(74) *Attorney, Agent, or Firm* — Buckley, Maschoff & Talwalkar LLC

(57) ABSTRACT

A system may include presentation of a visualization comprising a plurality of elements, detection of a first user input received at a first location of the visualization, presentation of a first indicator connecting the first location with a third location of the visualization, presentation of a first value of a measure, the first value associated with one of the plurality of elements located at least partially at the first location, detection of a second user input received at a third location of the visualization, presentation of a second indicator connecting the third location with the second location of the visualization, presentation of a second value of the measure, the second value associated with one of the plurality of elements located at least partially at the second location, determination of a composite value based on the first value and the second value, and presentation of the composite value at a fourth location of the visualization.

18 Claims, 8 Drawing Sheets

MULTI-TOUCH MEASURE COMPARISON

BACKGROUND

Modern computing systems are capable of quickly and efficiently presenting information. This capability is particularly evident and advantageous when used to present graphical representations of data. Such graphical representations may consist of visualizations such as bar graphs, pie charts, line charts, etc.

A user may wish to perform a comparison or other operation using two data values represented in such a visualization. Conventionally, for each data value, the user would select a corresponding graphical element (e.g., a pie sector, a bar graph bar) in order to view the data value associated therewith. The user would then perform the comparison or other operation mentally or within another application (e.g., a calculator application).

The foregoing techniques are not efficient, suitable or intuitive in some usage scenarios. Other systems for comparing visualized data values are desired.

DETAILED DESCRIPTION

Figure 1:
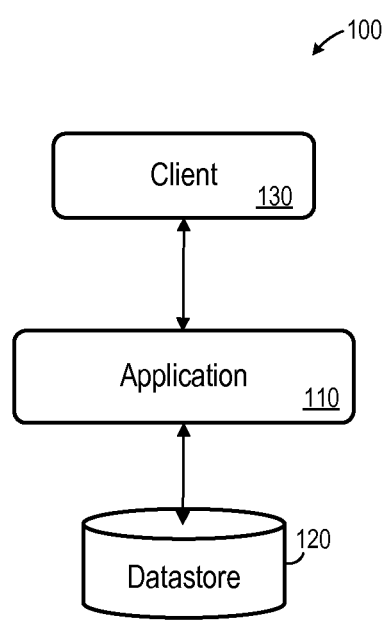
FIG. 1 is a block diagram of a system according to some embodiments.

FIG. 1 is a block diagram of system 100 according to some embodiments. FIG. 1 represents a logical architecture for describing processes according to some embodiments, and actual implementations may include more or different components arranged in other manners.

System 100 includes application 110 to provide data of datastore 120 to client 130. For example, client 130 may send a request for sales figures to application 110 and, in response, application 110 retrieves the requested figures from datastore 120 and returns them to client 130 for display to a user. System 100 may comprise a standalone apparatus, including but not limited to a desktop computer, a laptop computer, a tablet computer, and a smartphone.

Datastore 120 may comprise any one or more systems to store data. The data stored in datastore 120 may be received from disparate hardware and software systems, some of which are not interoperational with one another. The systems may comprise a back-end data environment employed in a business or industrial context. The data may be pushed to datastore 120 and/or provided in response to queries received therefrom. In some embodiments, datastore 120 comprises a fixed disk of a standalone apparatus which includes client 130 and application 110.

The data of datastore 120 may be stored in a traditional fixed disks or in-memory (e.g., in Random Access Memory) to allow fast retrieval and processing thereof. In some embodiments, the data may comprise a relational database, an in-memory database, a multi-dimensional database, an eXtendable Markup Language (XML) document, and/or any other structured data storage system. The physical tables of datastore 120 may be distributed among several relational databases, dimensional databases, and/or other data sources. To provide economies of scale, datastore 120 may include data of more than one customer. Application 110 therefore includes mechanisms to ensure that a client accesses only the data that the client is authorized to access. Moreover, the data of datastore 120 may be indexed and/or selectively replicated in an index.

The data of data store may include dimension values and measure values. A dimension represents an axis along which one may want to perform an analysis or view a report, such as Country, Product, Year, etc. Associated dimension values may be France, Shoes and 2010. Measures values can be determined for a given combination of dimension values (e.g., Sales in a given Country in a given Year, Units Sold of a given Product, etc.).

Client 130 displays user interfaces and data received from application 110, and may also be operated to process such data and send data to application 110 for storage in datastore 120. In some embodiments in which application 110 and datastore 120 are elements of a backend enterprise system, client 130 may comprise any suitable device, such as a desktop computer, a laptop computer, a tablet computer, and a smartphone. Client 130 may execute program code of a rich client application, an applet in a Web browser, or any other application to perform the processes attributed thereto herein. According to some embodiments, client 130 executes a standalone application (e.g., a spreadsheet application) which communicates with application 110 via Web Services to retrieve data therefrom.

Figure 2:
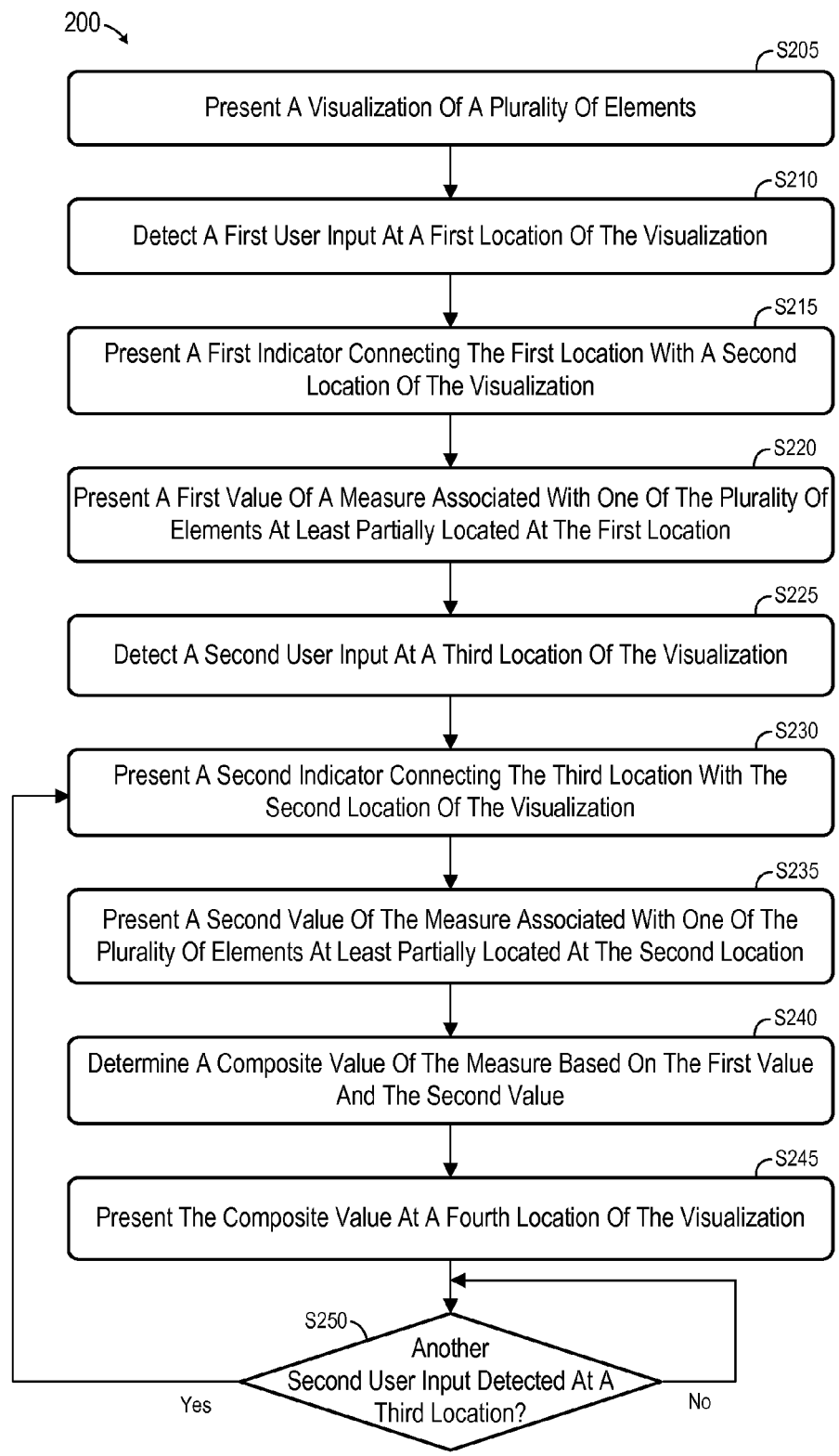
FIG. 2 is a flow diagram of a process according to some embodiments.

FIG. 2 comprises flow diagram of process 200 according to some embodiments. In some embodiments, various hardware elements of system 100 execute program code to perform process 200. In some embodiments, hard-wired circuitry may be used in place of, or in combination with, program code for implementation of processes according to some embodiments. Embodiments are therefore not limited to any specific combination of hardware and software.

Initially, at S205, a visualization is presented. The visualization includes a plurality of graphical elements. The visualization may comprise any visually-perceptible arrangement, and may be presented by any device suited for this purpose, including but not limited to a monitor, a touchscreen, a tablet computer, a smartphone, and/or a laptop screen.

Figure 3:
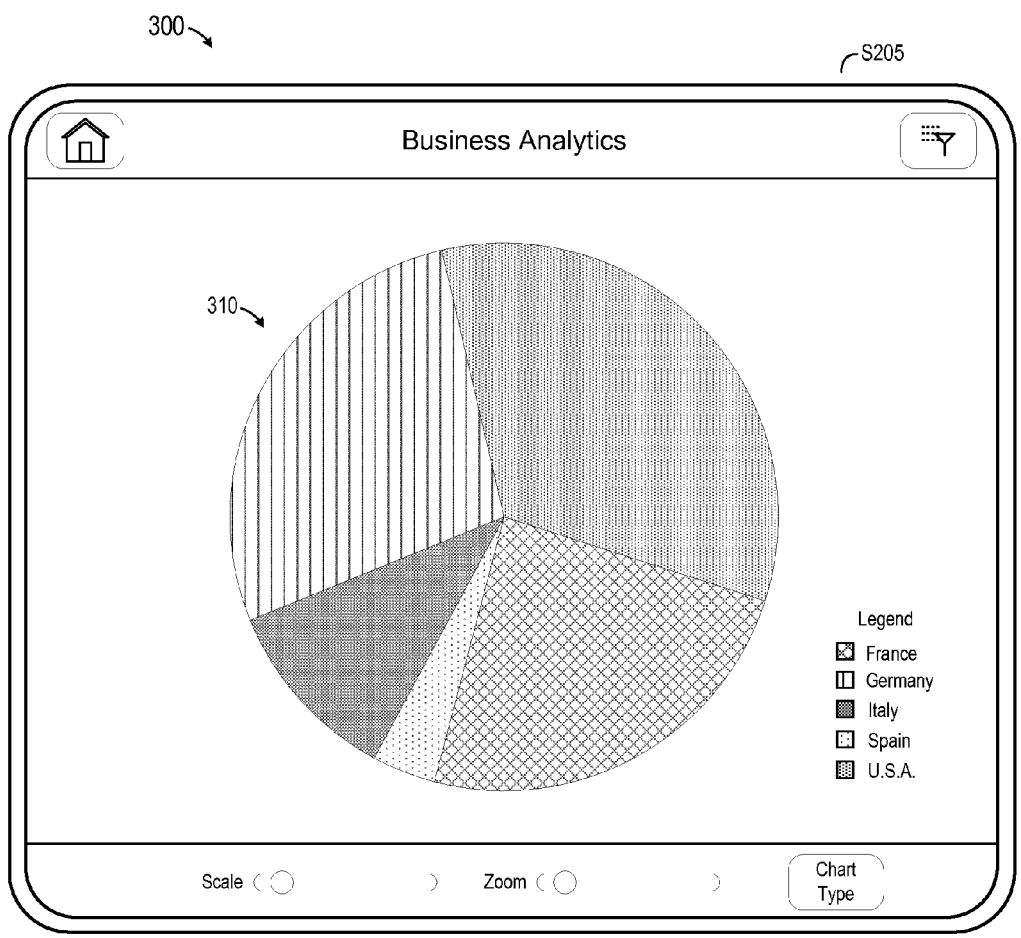
FIG. 3 is a view of a user interface according to some embodiments.

To assist in the present description of an example of process 200, FIG. 3 shows a view of display 300 presenting visualization 310 according to some embodiments. Visualization 310 comprises a pie chart, but embodiments are not limited thereto. The individual sectors of the pie chart may be considered as the plurality of elements mentioned above.

Visualization 310 may be presented by display 300 in response to execution of an application (e.g., a spreadsheet application, a Web browser, a business analytics application) by a processor. Embodiments are not limited to these examples.

Next, at S210, a first user input is detected at a first location of the presented visualization. A user may provide the input by using a mouse to move a cursor to the first location of visualization 310 and depressing a button on the mouse. According to the present example, display 300 includes a touch-sensitive input surface to receive input at one or more locations of visualization 310. Display 300 and the touch-sensitive input surface may share one or more hardware and/or software elements.

Figure 4:
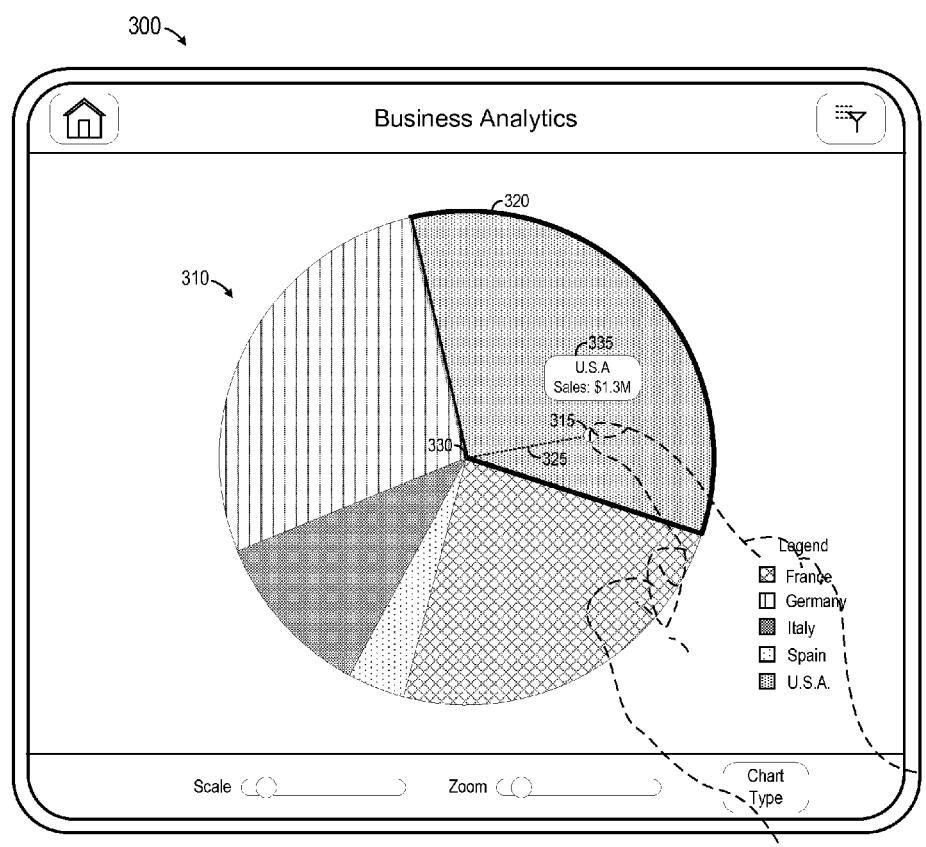
FIG. 4 is a view of a user interface according to some embodiments.

FIG. 4 illustrates the reception and detection of user input at S210 according to some embodiments. Specifically, the user touches location 315 of visualization 310. In response, indicator 325 is presented at S215. Indicator 325 connects first location 315 with location 330. Indicator 325 assists the user in identifying the location being touched (i.e., location 315). Although indicator 325 is presented as a dashed line, an indicator presented at S215 (and at S230, described below) may comprise any suitable graphical characteristics.

Location 330 is the center of visualization 310, although embodiments are not limited thereto. According to the present example, sector 320 is also presented as selected at S215 because location 315 lies within sector 320. In this regard, FIG. 4 shows element 320 with a thicker outline than shown in FIG. 3.

A first value of a measure is presented at S220. The first value of a measure is associated with one of the plurality of elements which is at least partially located at the first location. Generally, the value of the measure is associated with the dimension values represented by the one of the plurality of elements. In the present example, sector 320 represents the dimension value U.S.A. (i.e., of the dimension Country), and visualization 310 represents the measure Sales. Accordingly, at S220, graphic 335 is displayed to present the first value (i.e., $1.3M). Graphic 335 also displays the dimension value (U.S.A.) and the name of the measure (Sales). Embodiments may present the first value in any suitable visually-perceptible manner, and along with any other suitable data.

According to FIG. 4, the first value is presented in proximity to the location at which the first user input was detected (i.e., location 315). Such a presentation may be helpful in determining the dimension value(s) with which the present measure value is associated.

Figure 5:
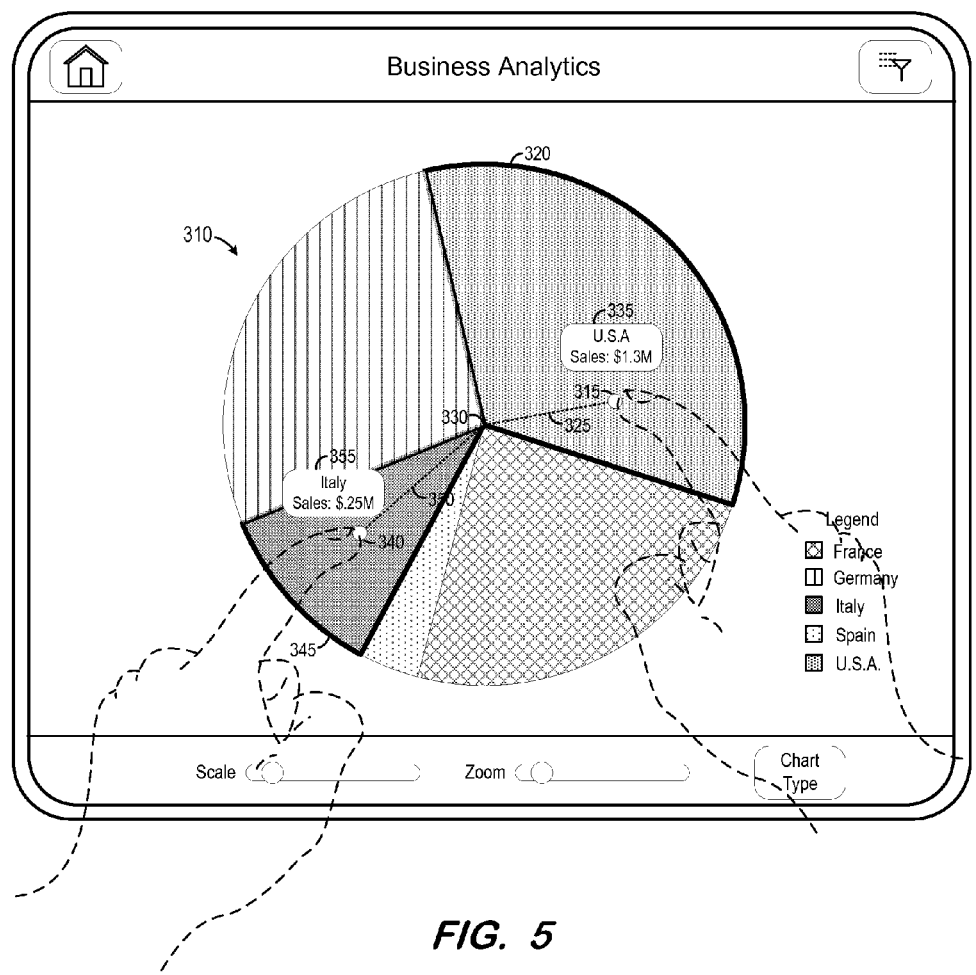
FIG. 5 is a view of a user interface according to some embodiments.

A second user input is detected at S225 at a third location of the presented visualization. FIG. 5 illustrates the reception and detection of the second user input at location 340 according to some embodiments. The input mechanism of the second user input may differ from that of the first user input in some embodiments. For example, the first user input may comprise a finger touch while the second user input may comprise a mouse click.

Indicator 350 is presented at S230 in response to the detection of the second user input. Indicator 350 connects third location 340 with second location 330. As described above, sector 345 is also presented as selected at S230 because location 340 lies therein.

A second value of the measure is presented at S235. The second value of the measure is associated with one of the plurality of elements which is at least partially located at the third location. In FIG. 5, graphic 355 is displayed to present the second value (i.e., $0.25M) associated with sector 345.

Next, at S240, a composite value of the measure is determined based on the first value and the second value. The composite value may comprise the result of any mathematical expression including at least the two values. Examples include, but are not limited to, SUM, DIFFERENCE, PRODUCT, MAX, MIN, AVG, etc. With respect to the present example, it will be assumed that the composite value is determined as the difference between the first value and the second value.

Figure 6:
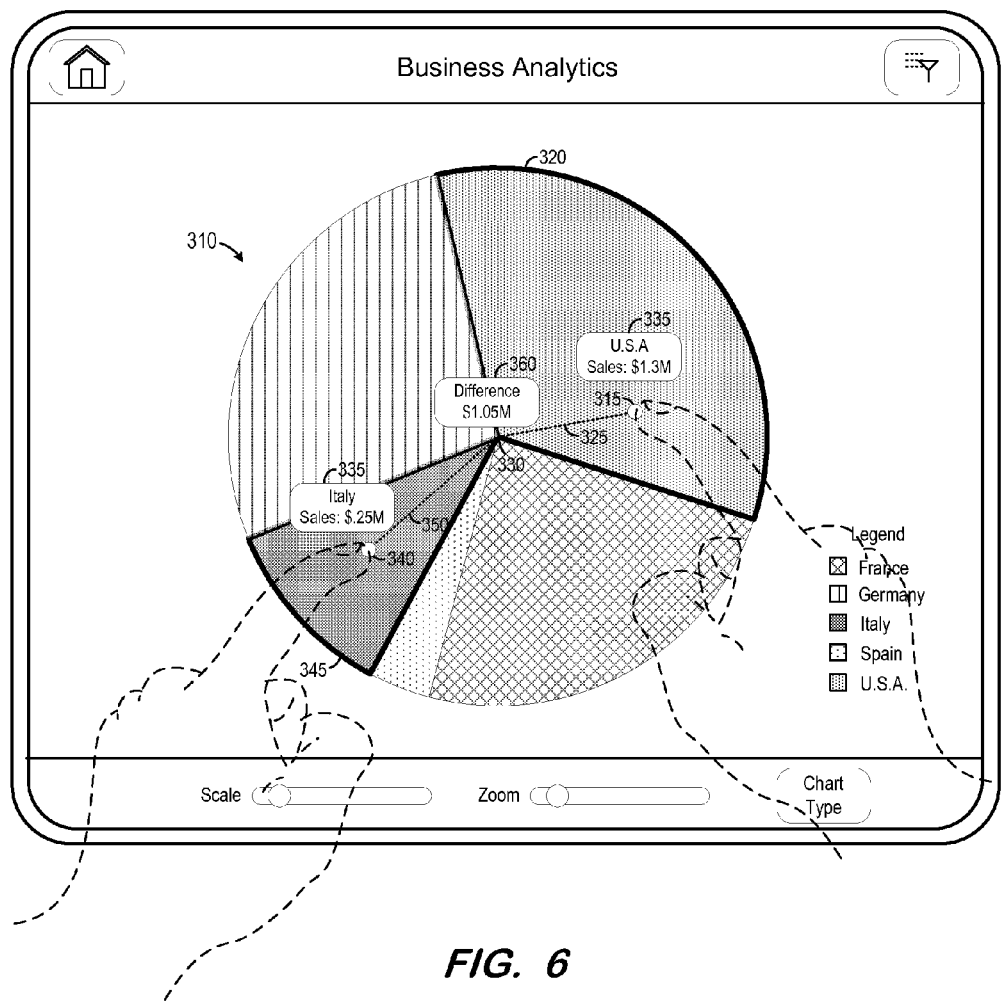
FIG. 6 is a view of a user interface according to some embodiments.

The composite value is presented at a fourth location of the visualization at S245. FIG. 6 shows graphic 360 presenting composite value $1.05M according to some embodiments. In some embodiments, the fourth location is located at the center of the visualization. The fourth location may be located between the first location and the third location in some embodiments.

Flow cycles at S250 until another "second" user input is detected at another "third" location. S250 therefore allows the user to select a new element of visualization in order to display a value associated therewith and a composite value based on the value and on the first value presented at S220.

Figure 7:
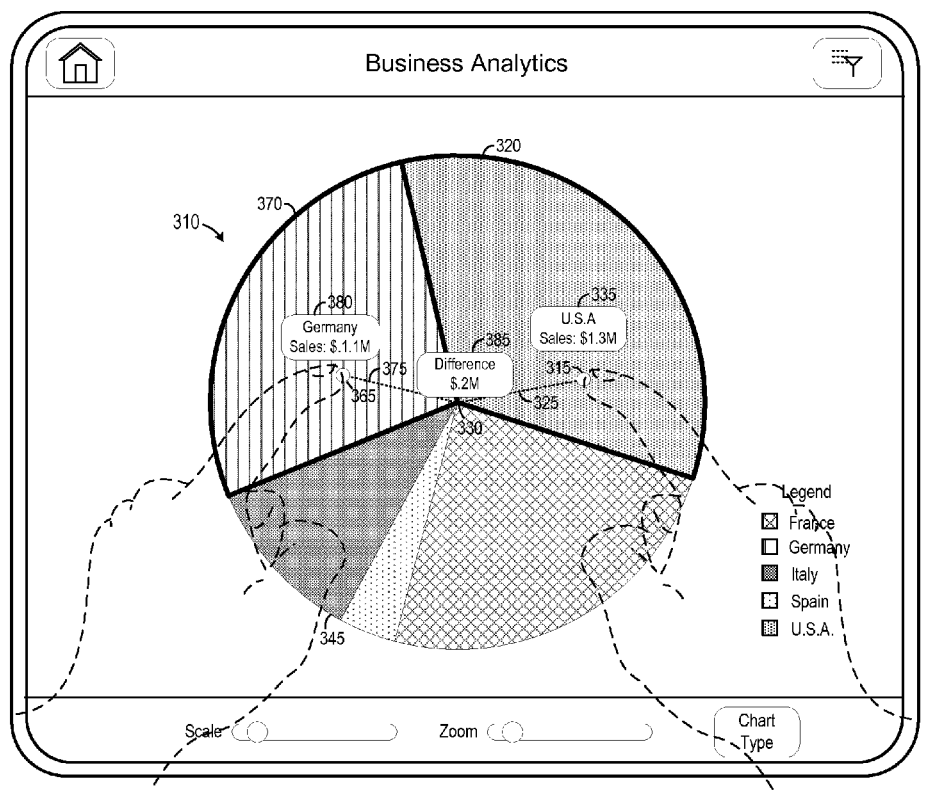
FIG. 7 is a view of a user interface according to some embodiments.

FIG. 7 illustrates detection of a second "second" user input at location 365 according to some embodiments. Flow therefore returns to S230 to present indicator 375 and continues to S235 to display graphic 380 presenting value $1.1M. Next, at S240, a composite value is determined based on the first value presented by graphic 335 and the value presented by graphic 380. Flow then continues as described above. In some embodiments, either the first user input or the second user input may be moved to a new location to cause display of a new measure and a new resulting composite value.

Some embodiments therefore provide intuitive and efficient comparison of measure values associated with a radial visualization, such as a pie chart or a donut chart. Embodiments may also provide intuitive and efficient comparison of measure values associated with other types of visualizations.

Figure 8:
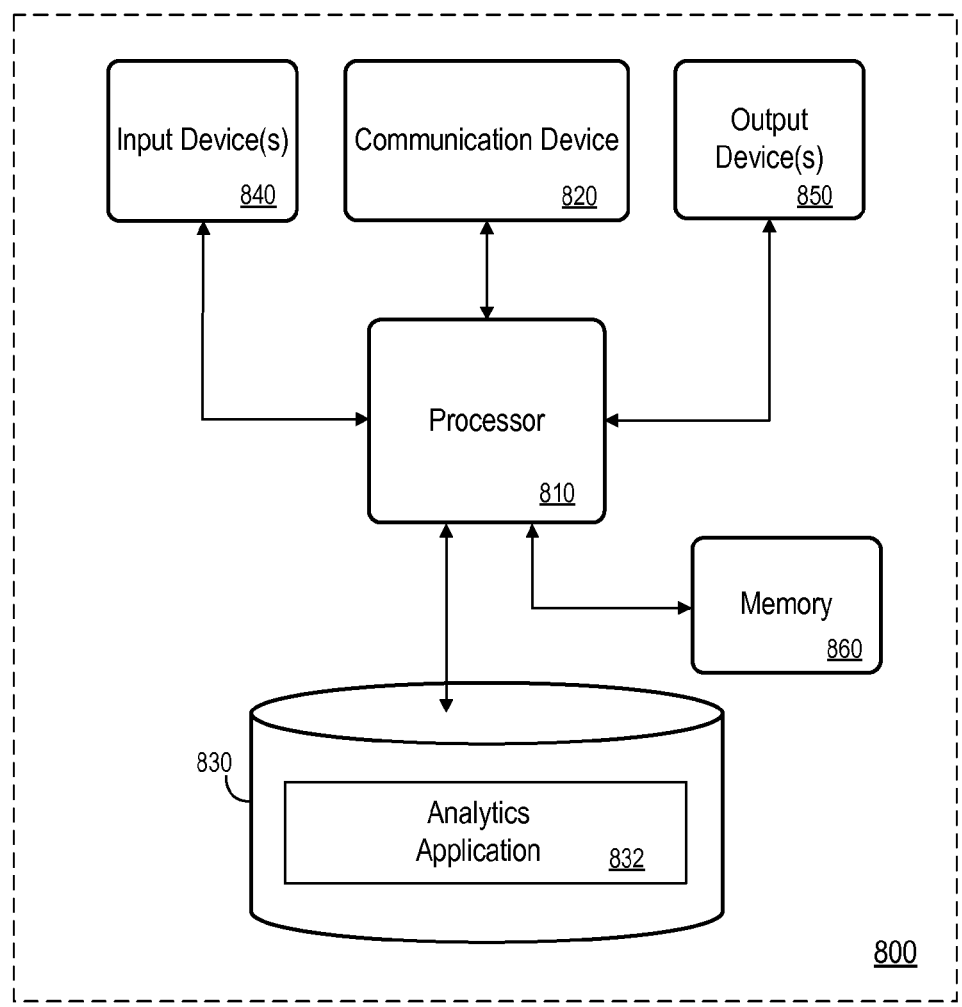
FIG. 8 is a block diagram of a computing device according to some embodiments.

FIG. 8 is a block diagram of apparatus 800 according to some embodiments. Apparatus 800 may comprise a general-purpose computing apparatus and may execute program code to perform any of the functions described herein. Apparatus 800 may comprise an implementation of one or more elements of system 100, and/or of a client device on which the visualizations of the present description are presented. Apparatus 800 may include other unshown elements according to some embodiments.

Apparatus 800 includes processor 810 operatively coupled to communication device 820, data storage device 830, one or more input devices 840, one or more output devices 850 and memory 860. Communication device 820 may facilitate communication with external devices, such as an external design tool. Input device(s) 840 may comprise, for example, a touch-sensitive screen, a mouse or other pointing device, a keyboard, a keypad, a microphone, knob or a switch, an infra-red (IR) port, and/or a docking station. Input device(s) 840 may be used, for example, to enter information into apparatus 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM).

Analytics application 832 of data storage device 830 may comprise program code executable by processor 810 to provide the functionality described herein. Embodiments are not limited to execution of these functions by a single apparatus. Data storage device 830 may also store data and other program code for providing additional functionality and/or which are necessary for operation thereof, such as device drivers, operating system files, etc.

Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. An apparatus comprising:
    a display to present a visualization comprising a plurality of elements;
    an input device to receive user input; and
    a processor to:
      detect a first user input received by the input device at a first location of the visualization;
      control the display to present a first indicator connecting the first location with a third location of the visualization;
      control the display to present a first value of a measure, the first value associated with one of the plurality of elements located at least partially at the first location;
      detect a second user input received by the input device at a third location of the visualization;
      control the display to present a second indicator connecting the third location with the second location of the visualization;
      control the display to present a second value of the measure, the second value associated with one of the plurality of elements located at least partially at the second location;
      determine a composite value based on the first value and the second value; and
      control the display to present the composite value at a fourth location of the visualization.

2. An apparatus according to claim 1, wherein the second user input is detected while the first user input is detected.

3. An apparatus according to claim 1, the processor further to:
    detect a third user input received by the input device at a fifth location of the visualization;
    control the display to present a third indicator connecting the fifth location with the second location of the visualization;
    control the display to present a third value of the measure, the third value associated with one of the plurality of elements located at least partially at the fifth location;
    determine a second composite value based on the first value and the third value; and
    control the display to present the second composite value at the fourth location of the visualization.

4. An apparatus according to claim 1, the processor further to:
    detect a third user input received by the input device at a fifth location of the visualization;
    control the display to present a third indicator connecting the fifth location with the second location of the visualization;
    control the display to present a third value of the measure, the third value associated with one of the plurality of elements located at least partially at the fifth location;
    determine a second composite value based on the first value and the third value; and
    control the display to present the second composite value at a sixth location of the visualization.

5. An apparatus according to claim 1, wherein the visualization comprises a radial chart,
    wherein the one of the plurality of elements located at least partially at the first location is a first circular sector of the radial chart,
    and wherein the one of the plurality of elements located at least partially at the second location is a second circular sector of the radial chart.

6. An apparatus according to claim 5, wherein the second location is a center of the radial chart.

7. A non-transitory computer-readable medium having program code stored thereon, the program code executable by a processor to cause an apparatus to:
    present a visualization comprising a plurality of elements;
    detect a first user input received at a first location of the visualization;
    present a first indicator connecting the first location with a third location of the visualization;
    present a first value of a measure, the first value associated with one of the plurality of elements located at least partially at the first location;
    detect a second user input received at a third location of the visualization;
    present a second indicator connecting the third location with the second location of the visualization;
    present a second value of the measure, the second value associated with one of the plurality of elements located at least partially at the second location;
    determine a composite value based on the first value and the second value; and
    present the composite value at a fourth location of the visualization.

8. A medium according to claim 7, wherein the second user input is detected while the first user input is detected.

9. A medium according to claim 7, the program code executable by a processor to further cause an apparatus to:
    detect a third user input received at a fifth location of the visualization;
    present a third indicator connecting the fifth location with the second location of the visualization;
    present a third value of the measure, the third value associated with one of the plurality of elements located at least partially at the fifth location;
    determine a second composite value based on the first value and the third value; and
    present the second composite value at the fourth location of the visualization.

10. A medium according to claim 7, the program code executable by a processor to further cause an apparatus to:
    detect a third user input received at a fifth location of the visualization;
    present a third indicator connecting the fifth location with the second location of the visualization;
    present a third value of the measure, the third value associated with one of the plurality of elements located at least partially at the fifth location;

determine a second composite value based on the first value and the third value; and present the second composite value at a sixth location of the visualization.

11. A medium according to claim 7, wherein the visualization comprises a radial chart,
   wherein the one of the plurality of elements located at least partially at the first location is a first circular sector of the radial chart,
   and wherein the one of the plurality of elements located at least partially at the second location is a second circular sector of the radial chart.

12. A medium according to claim 11, wherein the second location is a center of the radial chart.

13. A method comprising:
   presenting a visualization comprising a plurality of elements;
   detecting a first user input received at a first location of the visualization;
   presenting a first indicator connecting the first location with a third location of the visualization;
   presenting a first value of a measure, the first value associated with one of the plurality of elements located at least partially at the first location;
   detecting a second user input received at a third location of the visualization;
   presenting a second indicator connecting the third location with the second location of the visualization;
   presenting a second value of the measure, the second value associated with one of the plurality of elements located at least partially at the second location;
   determining a composite value based on the first value and the second value; and
   presenting the composite value at a fourth location of the visualization.

14. A method according to claim 13, wherein the second user input is detected while the first user input is detected.

15. A method according to claim 13, further comprising:
   detecting a third user input received at a fifth location of the visualization;
   presenting a third indicator connecting the fifth location with the second location of the visualization;
   presenting a third value of the measure, the third value associated with one of the plurality of elements located at least partially at the fifth location;
   determining a second composite value based on the first value and the third value; and
   presenting the second composite value at the fourth location of the visualization.

16. A method according to claim 13, further comprising:
   detecting a third user input received at a fifth location of the visualization;
   presenting a third indicator connecting the fifth location with the second location of the visualization;
   presenting a third value of the measure, the third value associated with one of the plurality of elements located at least partially at the fifth location;
   determining a second composite value based on the first value and the third value; and
   presenting the second composite value at a sixth location of the visualization.

17. A method according to claim 13, wherein the visualization comprises a radial chart,
   wherein the one of the plurality of elements located at least partially at the first location is a first circular sector of the radial chart,
   and wherein the one of the plurality of elements located at least partially at the second location is a second circular sector of the radial chart.

18. A method according to claim 17, wherein the second location is a center of the radial chart.

* * * * *